July 4, 1961
J. A. WILSON, JR., ET AL
2,990,848
FLUID PRESSURE DIFFERENTIAL CONTROL
Filed July 19, 1955
2 Sheets-Sheet 1
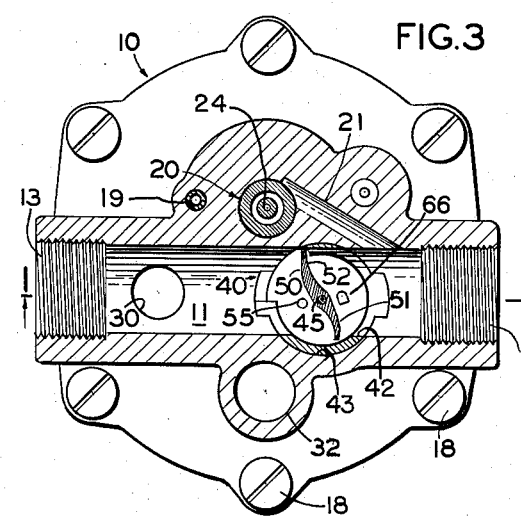
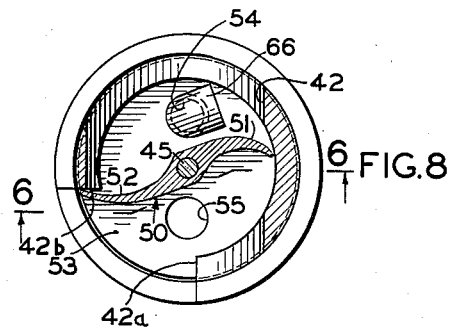
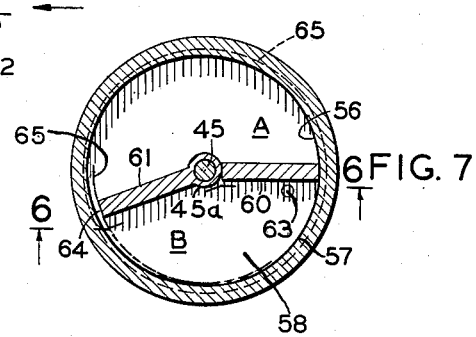
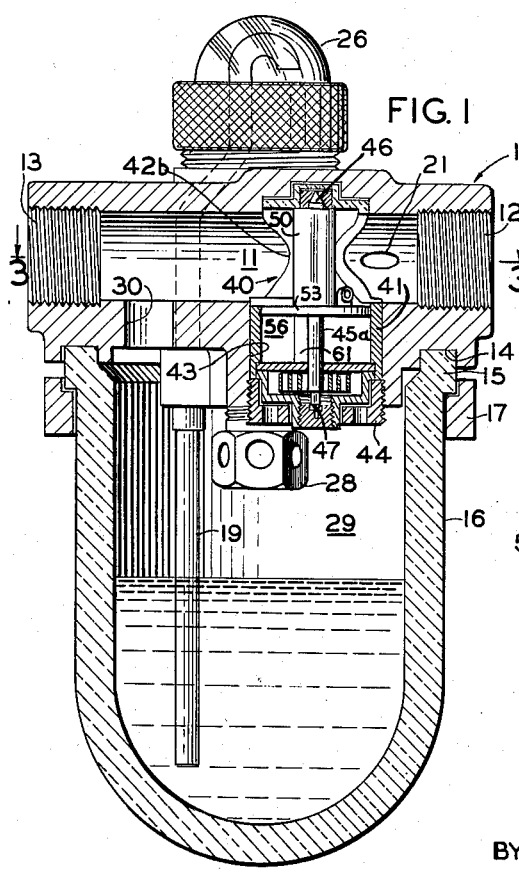
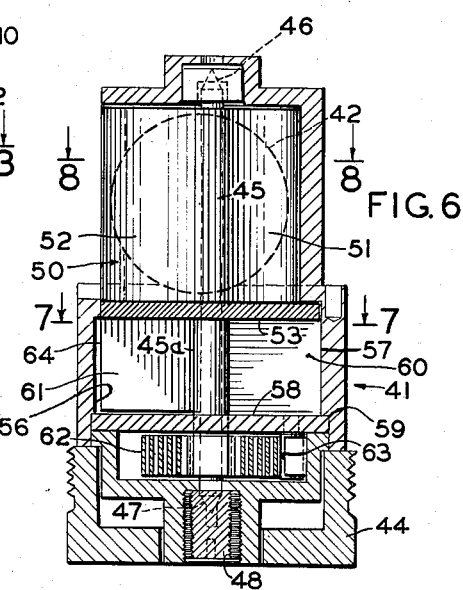
INVENTORS
JESSE A. WILSON JR.
MORLEY V. FRIEDELL
BY *Schroeder, Hofgren, Brady a Wegner*
ATTORNEYS July 4, 1961  J. A. WILSON, JR., ET AL  2,990,848
FLUID PRESSURE DIFFERENTIAL CONTROL
Filed July 19, 1955  2 Sheets-Sheet 2
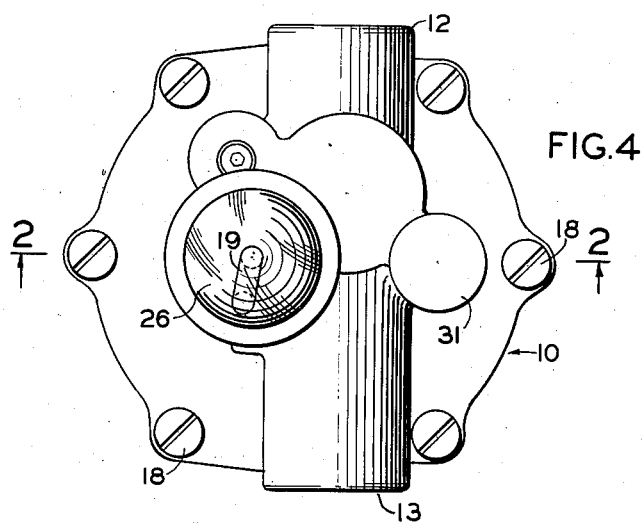
FIG. 4
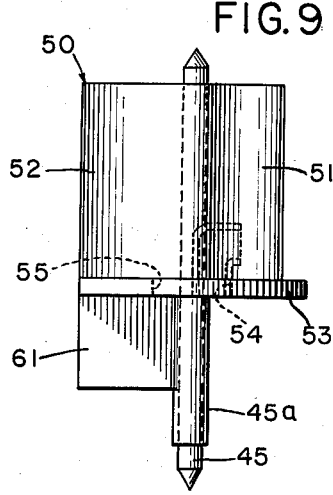
FIG. 9
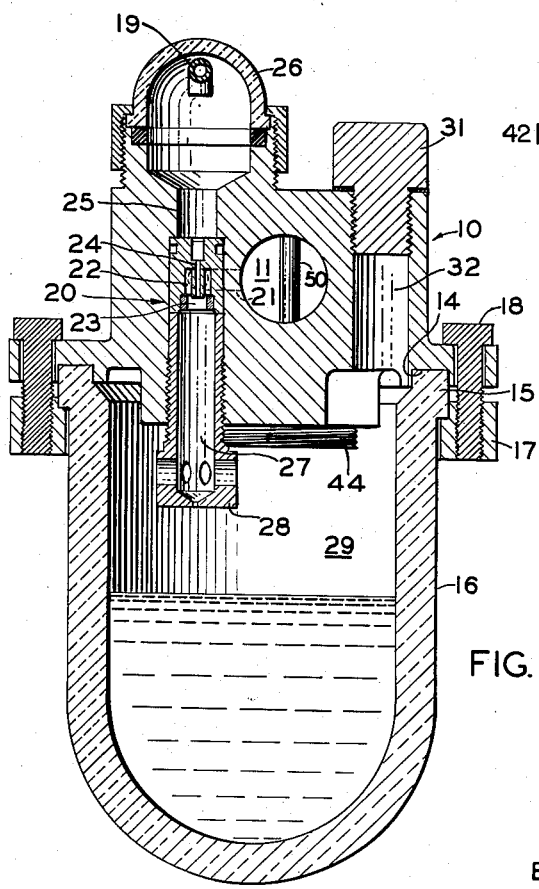
FIG. 2
FIG. 5
INVENTORS
JESSE A. WILSON JR.
MORLEY V. FRIEDELL
BY Schroeder, Hofgren, Brady & Wegner
ATTORNEYS

# United States Patent Office 2,990,848
Patented July 4, 1961

2,990,848
FLUID PRESSURE DIFFERENTIAL CONTROL
Jesse A. Wilson, Jr., Littleton, and Morley V. Friedell, Wheatridge, Colo., assignors to C. A. Norgren Co., a corporation of Colorado
Filed July 19, 1955, Ser. No. 523,053
4 Claims. (Cl. 137—503)

This invention relates to a control, and more particularly to a control for automatically providing a desired pressure differential between two sections of a fluid conduit.

It is the general object of the present invention to produce a new and improved control of the character described.

It is a more specific object of the invention to provide a control which will produce a desired pressure differential between two sections of a conduit carrying a fluid, even with wide variations in the pressure and volume of the fluid passing through the conduit.

One of the features of the present invention is the provision of a member providing a flow restriction in a passage interconnecting two fluid conduits, thereby to produce a pressure drop on the downstream side of the restriction, and to associate with said member means for moving the same to vary the restrictive effect thereof with variations in the flow through said passage, thus maintaining a desired pressure differential between said conduits.

A more specific object of the invention is to provide a control vane movably mounted in a passage interconnecting two sections of a fluid conduit together with fluid motor means operated by the flow of fluid through said passage to move the control vane, thereby providing a variable restriction in said passage to maintain a desired pressure drop between said conduit sections with changes in said flow.

Another object of the invention is to produce a control apparatus of the character described in the preceding paragraph, in which said motor is a vane-type motor having a motor chamber with a fixed and movable vane therein, with the movable vane being subjected to the fluid pressure conditions existing in the passage on either side of the control vane therein, thereby to operate said motor in accordance with changes in the flow conditions in the passage.

Yet another object of the invention is to produce a new and improved aerosol generator for generating a fog of lubricant and introducing the fog into an air pressure line wherein the fog is generated by utilizing the pressure differential existing on opposite sides of a restriction in said air line, together with control means for maintaining a substantially constant pressure differential on opposite sides of said restriction, regardless of the volume of air flow through the line.

Other and further objects of the invention will be readily apparent from the following description and drawings, in which:

FIG. 1 is a vertical section through an aerosol-generating device incorporating the features of the present invention;

FIG. 2 is a view like FIG. 1, but taken from a position 90° therefrom and generally along line 2—2 of FIG. 4;

FIG. 3 is a horizontal sectional view taken along line 3—3 of FIG. 1;

FIG. 4 is a top plan view of the apparatus of FIG. 1;

FIG. 5 is an enlarged side elevational view of the control portion of the apparatus shown in FIG. 1;

FIG. 6 is a vertical sectional view of the apparatus of FIG. 5, and taken along staggered line 6—6 of FIGS. 7 and 8;

FIG. 7 is a horizontal sectional view along line 7—7 of FIG. 6;

FIG. 8 is a horizontal sectional view along line 8—8 of FIG. 6; and

FIG. 9 is a side elevational view of a portion of the control of FIG. 5 showing the control vane and motor vane detail.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

While it will be readily apparent to those skilled in the art to which this invention pertains that the pressure differential control hereinafter to be described in detail has many application in the field of fluid controls, it is shown in the drawings as embodied in a device for supplying a lubricant in the form of an aerosol into an air line utilized to operate pneumatic devices. Pneumatically-operated devices, such as sanders and the like, which employ an air-operated motor are best supplied with lubricant for the motor by means of the air line which supplies the motivating air under pressure. The aerosol generators used in conjunction with such systems often employ a venturi type of atomizer for breaking up oil into very fine particles, with such generators utilizing the pressure differential existing between the upstream and downstream sides of a restriction in the air conduit or supply line to effect such breaking up of the oil and to carry the oil flow into the line for transportation to the tool. Where a single tool is utilized in the line, the orifice size and aerosol generator passage sizes may be proportioned to produce the desired amount of fog to achieve proper lubrication. Where, however, a plurality of tools utilize air under pressure from a single line, conditions are produced where the number of tools in use at any given instant may vary over wide limits, and thus the volume of flow in the air line also varies. Such variations in flow naturally result in variations in the amount of fog generated by the generator, and result in conditions where the amount of lubricant in aerosol form delivered into the air line may be below or in excess of the requirement of the tools then being used.

According to the present invention, however, the means forming the orifice in the air line to create the necessary pressure differential to operate the aerosol generator is movable with changes in the flow of air through the line, so as to vary its restrictive effect in the line, and thus may maintain a constant desired pressure drop between the upstream and downstream sides thereof so as to cause the generator to produce the proper amount of lubricating fog, regardless of the volume of flow through the air line and changes in the air pressure.

Referring now to FIGS. 1 and 3 of the drawings, there is shown a casing 10 having a passage 11 formed therein, with the passage having an inlet 12 and an outlet 13 to be connected to fluid conduits forming the air line. Positioned in an annular groove 14 formed on the bottom of the casing is the upper edge 15 of a reservoir 16 adapted to contain a supply of lubricating oil. The edge 15 is held in the annular groove by means of a retaining ring 17 secured to the casing 10 by a plurality of screws 18.

Oil within the reservoir 16 is drawn through a tube 19 to an aerosol generator 20 (FIG. 2). The generator 20 is supplied with air under pressure through a passage 21 opening at one end into the passage 11 adjacent the inlet 12, and opening at its other end to the throat 22 of a venturi section 23. Air exiting from the passage 21 passes adjacent the reduced end of a feed tube 24, the other end of which opens into a chamber 25 formed beneath a transparent sight dome 26, with such air serving to reduce the pressure adjacent the lower end of the tube 24, thus causing oil to rise in the tube 19, drop into the chamber 25, and ultimately to pass through the tube 24 into the high velocity air stream adjacent the throat of the venturi. The force of the air stream serves to break up the oil into a fine aerosol or fog, which passes downwardly through a chamber 27 and outwardly through a diffusion plug 28 into a settling chamber 29 within the reservoir 16. In the settling chamber, heavier particles of oil may settle out of the aerosol by gravity while the lighter particles are carried by the air stream through a passage 30 (FIGS. 1 and 3) and into the passage 11 adjacent the outlet 13. The oil supply within the reservoir 16 may be renewed from time to time by removing a plug 31 which caps the upper end of a supply passage 32 opening into the reservoir.

The rate at which oil is fed into the chamber 25 and tube 24 depends upon the velocity of air passing through the throat of the venturi, and this velocity in turn is dependent upon the pressure differential existing on opposite sides of flow restricting means 40 (see FIG. 1) located in the passage 11. If the flow restricting means 40 occupied a fixed position in the passage 11, it is clear that if the volume of air flow through the passage increased, with no change in inlet pressure, the pressure differential between opposite sides of the flow restricting means 40 would also increase, thereby increasing the amount of fog generated. Similarly, a reduction in the volume of air passing through the passage would produce a reduction in such pressure differential and a consequent reduction in the amount of aerosol produced. Such a situation results in the furnishing of too little lubricant when the volume is low and too much lubricant when the volume is high.

As previously indicated, however, the flow restricting means 40 is movable to vary its flow restrictive effect in accordance with changes in the flow conditions existing in the passage 11. To this end the flow restricting means of the present invention comprises a generally cylindrical housing 41 (see FIGS. 1 and 5–8) having at its top a transverse bore 42 aligned with the passage 11, with the upper portion of the cylinder having an additional cut out segment extending about 90° around the top of the cylinder between **42*a* and 42*b*. The housing is held in an opening 43 in the casing by a retaining ring 44 to align said bore with the passage 11. A rod 45 extends substantially from end to end of the housing and is rotatably mounted therein in a top pivot bearing 46 and a bottom pivot bearing 47, with the latter bearing being formed in a nut 48** so as to be adjustable.

The flow restricting means 40, as embodied in the form of the invention illustrated, comprises a generally S-shaped control vane 50 mounted on the upper end of the rod 45 and having a first wing 51 and a second larger wing 52 (FIG. 8). The wing portions of the control vane are located within the open portion 42 of the housing, and hence within the passage 11.

As best seen in FIGS. 6, 8 and 9, a disc 53 is fixed to the rod and control vane and is rotatable therewith. The disc is positioned immediately below the vane 50 and is provided with passageways 54 and 55 located on either side of the control vane, each opening into a cylindrical motor chamber 56 defined between the lower surface of the disc 53, side walls 57 of the housing, and the upper surface of a second disc 58 seated in a stepped portion 59 of the housing.

The motor chamber 56 comprises a part of a vane-type motor, including a radial wall 60 fixed to the disc 58 and a movable vane 61 secured to the disc 53 and to a sleeve **45*a* surrounding and fixed to the rod 45**.

Beneath the disc 58 is a torsion spring 62 having one end secured to the rod and its other end secured to a pin 63 provided on the lower side of the second disc 58.

The axis of the rod 45 is offset from the axis of the motor chamber 56, so that a varying clearance is provided between the end 64 of the movable vane and the inner surface of the side wall 57 as the vane moves within the motor chamber. The eccentricity existing between the axis of the motor chamber and the axis of the rod 45 is indicated by the dotted line 65 of FIG. 7.

To describe the operation of the pressure differential control, it can be assumed that a normal operating pressure in the fluid conduits of eighty pounds has been provided, and that none of the tools or other apparatus to which the air line is connected are in use. Under these conditions, the pressures on opposite sides of the control vane 50 are equal, no fog is created by the aerosol generator (as no flow through the passage 21 would occur under such circumstances), and the vane 50 would occupy the position shown in FIGS. 3 and 8, being biased to such position by the torsion spring 62. As an air valve downstream of the outlet 13 is opened, the initial flow of air would result in leakage past the necessary clearances adjacent the ends and top and bottom of the control vane 50. Such flow would of course create a pressure differential on opposite sides of the control vane to initiate air flow through the aerosol generator and the generation of fog. Air flow into the passageway 54, and thence into the motor chamber 60 on one side (indicated by A) of the radial wall 60, could pass to the opposite side (B) of the motor chamber through the clearance passage between the outer end 64 of the movable vane and the motor chamber, thus producing no rotation of the movable vane 61. Assuming that a three-pound pressure drop is desired to produce the required amount of aerosol, when such pressure differential has been created the control vane 50 will begin to rotate in a counterclockwise direction (as viewed in the figures) because of the differential area of the two wings, and when the outer tips of the wings clear the sides of the passage 11, air will begin to flow through the space thus created. Rotation of the control vane 50 also rotates the motor vane 61, moving it to a position where less clearance exists between its outer end and the motor chamber walls. The vane 50 will stabilize at a position maintaining the desired 3 p.s.i. pressure drop. If the flow through the passage 11 increases beyond this point, the control vane 50 rotates further, due both to the motor effect of its S shape and also because of the force exerted by the movable motor vane 61. Such further rotation of the motor vane again reduces the clearance between its outer end and the motor chamber walls, thus increasing its rotative effect on the control vane 50. At maximum flow, the control vane 50 lies approximately parallel to the flow through the passage 11. At that point the funnel-shaped tube 66 forming the entrance end of the passageway 54 will be facing directly into the incoming air stream, and the vane motor will be operating at its highest efficiency.

From the foregoing, it can be seen that the combined effects of velocity and pressure on the wings 51 and 52 of the control vane and on the motor vane 61 have been utilized to overcome the torsion of the spring 62 to permit rotation of the control vane to a position decreasing its restrictive effect on flow through the passage 11 with increasing flow therethrough.

While the specific control just described and illustrated in the drawings is designed to maintain a constant pressure drop on the upstream and downstream sides thereof, obviously it can be constructed to produce either an increasing pressure drop with increasing flow or a decreasing pressure drop with increasing flow by properly proportioning the relative sizes of the wings 51 and 52 and by varying the eccentricity of the motor chamber 56 relative to the axis of the rod 45. Furthermore, if desired the wings 51 and 52 may be of equal size, in which event the chamber 56 should be proportioned so as to provide but a slight clearance when the vane 50 is in the closed position illustrated in FIG. 8, a greater clearance as the vane moves toward open position, and then a decreasing clearance as it moves to fully open position parallel with the flow. In such case the vane motor would effect the opening of the control vane.

Other and further variations of the shape and proportion of the control parts may be utilized to effect a desired control of the pressure drop within the passage 11.

We claim:

1. Apparatus for maintaining a desired pressure differential between two sections of a fluid conduit interconnected by a passage comprising a control vane pivotally mounted in the passage, said vane being substantially S-shaped in cross section normal to the pivotal axis thereof and having a pair of wings of unequal length, said vane being pivotable by increasing velocity of fluid flow through the passage from a first position in which said wings extend across and substantially block said passage to a second position wherein said wings are substantially parallel to fluid flow through the passage, a vane-type fluid motor including an eccentric generally cylindrical chamber having a fixed radial wall therein, a motor vane movable in the chamber and connected to pivot the control vane, a first passageway opening at one end to said passage on one side of the control vane and opening at its other end to said chamber on one side of the fixed wall, a second passageway opening at one end to said passage on the other side of the control vane and opening at its other end to said chamber on the other side of the fixed wall, the eccentricity of said chamber being such as to vary the clearance between the motor vane and the chamber walls as said motor vane moves in said chamber, the eccentricity of the chamber and the relative size of said wings being proportioned to produce a force acting on the control vane to move it toward said second position upon initial creation of the desired pressure differential between said sections and to continue to move the control vane toward said second position as flow through said passage increases, and means biasing the control vane toward pivotal movement to said first position.

2. In a lubricating device wherein an aerosol of oil is generated by utilizing the pressure differential on opposite sides of a restriction in an air passage and said aerosol is then combined with air moving through the passage downstream of the restriction, means for maintaining said pressure differential substantially constant over wide range of volumes of air flow through said passage comprising a generally cylindrical housing having an open portion positioned in said passage, a rod extending through said housing and mounted therein for pivotal movement about an axis parallel to and offset from the axis of said housing, a control vane secured to said rod, said vane having a pair of wings of unequal length positioned in said open portion and proportioned to substantially close said passage when the control vane is in a first position and progressively to open said passage as the vane moves to a second position, said vane being substantially S-shaped in cross section normal to the pivotal axis thereof whereby increasing velocity of air flow through the passage urges the vane towards said second position, a first disc in the housing and secured to the rod, a second disc fixed in the housing, said second disc being parallel to and spaced from the first disc to provide, with the sidewalls of the housing, a cylindrical motor chamber therebetween, a fixed radial wall in the motor chamber, a motor vane in the motor chamber and secured to the rod, a first passageway extending through the first disc and opening at one end to said motor chamber on one side of the fixed wall, said passageway terminating at its other end in a funnel-shaped air scoop carried by the first disc on the upstream side of the control vane and arranged to face upstream in the passage when the control vane is in said second position, a second passageway extending through the first disc on the downstream side of the control vane and opening into said motor chamber on the other side of the fixed wall, whereby increasing pressure differentials in the passage between the upstream and downstream side of the control vane will move the movable vane to pivot the control vane toward said second position, the offset of the axis of the rod being arranged to cause a decreasing clearance between the end of the motor vane and said sidewalls as the control vane moves toward said second position, and a torsion spring in the housing and connected to the rod for constantly biasing the control vane toward pivotal movement to said first position.

3. Apparatus for maintaining a selected fluid pressure differential between two sections of a fluid conduit interconnected by a passage comprising a vane mounted in said passage for movement between a first position providing a minimum fluid passage area through a plurality of intermediate positions providing increasing fluid passage areas, to a second position providing maximum fluid passage area, said vane being generally S-shaped to be moved toward said second position by a force directly proportional to the velocity of fluid flow through said passage, a fluid motor connected to said vane, said fluid motor being operable by increasing fluid pressure differential on opposite sides of said vane constantly to urge said vane toward said second position with a force directly proportional to said pressure differential, passageways for transmitting to said fluid motor the fluid pressures in said passage upstream and downstream of said vane, and means biasing said vane to said first position, said biasing means providing an increasing biasing force against movement of the vane to said second position whereby said vane may be maintained in any of said positions in accordance with flow through said passage.

4. Apparatus for maintaining a selected fluid pressure differential between two sections of a fluid conduit interconnected by a passage comprising a vane mounted in said passage for movement between a first position providing a minimum fluid passage area through a plurality of intermediate positions providing increasing fluid passage areas, to a second position providing maximum fluid passage area, said vane having two wing portions of unequal area to be moved toward said second position by a force directly proportional to the velocity of fluid flow through said passage, a fluid motor connected to said vane, said fluid motor being operable by increasing fluid pressure differential on opposite sides of said vane constantly to urge said vane toward said second position with a force directly proportional to said pressure differential, passageways for transmitting to said fluid motor the fluid pressures in said passage upstream and downstream of said vane, and means biasing said vane to said first position, said biasing means providing an increasing biasing force against movement of the vane to said second position whereby said vane may be maintained in any of said positions in accordance with flow through said passage.

(References on following page)

References Cited in the file of this patent
UNITED STATES PATENTS

| | | |
|---|---|---|
| 436,235 | Griffin | Sept. 9, 1890 |
| 1,203,689 | Blunt | Nov. 7, 1916 |
| 1,317,047 | Shields | Sept. 23, 1919 |
| 1,330,265 | Hinton | Feb. 10, 1920 |
| 1,339,128 | Nye | May 4, 1920 |
| 1,584,929 | Handy | May 18, 1926 |
| 1,906,855 | Heyl | May 2, 1933 |
| 2,010,694 | Jones | Aug. 6, 1935 |
| 2,053,668 | Kinzie | Sept. 8, 1936 |
| 2,100,427 | Blocker | Nov. 30, 1937 |
| 2,220,496 | Ringlestetter | Nov. 5, 1940 |
| 2,322,883 | Reichel | June 29, 1943 |
| 2,415,508 | Mallory | Feb. 11, 1947 |
| 2,508,396 | Jordan | May 23, 1950 |

FOREIGN PATENTS

| | | |
|---|---|---|
| 3,326 | Great Britain | of 1875 |
| 35,640 | Holland | June 15, 1935 |